United States Patent
Adey et al.

(10) Patent No.: US 9,162,908 B2
(45) Date of Patent: Oct. 20, 2015

(54) SEPARATOR DEVICE FOR A HEATING SYSTEM

(71) Applicant: Adey Holdings Limited, Cheltenham (GB)

(72) Inventors: Christopher Adey, Battledown (GB); Simon Downie, Leckhampton (GB)

(73) Assignee: Adey Holdings (2008) Limited, Cheltenham (GB)

( * ) Notice: Subject to any disclaimer, the term of this patent is extended or adjusted under 35 U.S.C. 154(b) by 0 days.

(21) Appl. No.: 14/401,948

(22) PCT Filed: May 21, 2013

(86) PCT No.: PCT/GB2013/051321
§ 371 (c)(1),
(2) Date: Nov. 18, 2014

(87) PCT Pub. No.: WO2013/175195
PCT Pub. Date: Nov. 28, 2013

(65) Prior Publication Data
US 2015/0096928 A1   Apr. 9, 2015

(30) Foreign Application Priority Data
May 21, 2012 (GB) .................................. 1208916.5

(51) Int. Cl.
| | |
|---|---|
| *C02F 1/48* | (2006.01) |
| *B01D 21/00* | (2006.01) |
| *B01D 21/24* | (2006.01) |
| *B03C 1/28* | (2006.01) |
| *F24D 19/00* | (2006.01) |
| *C02F 101/20* | (2006.01) |

(52) U.S. Cl.
CPC ............ *C02F 1/481* (2013.01); *B01D 21/0009* (2013.01); *B01D 21/0042* (2013.01); *B01D 21/2405* (2013.01); *B01D 21/2411* (2013.01); *B01D 21/2483* (2013.01); *B03C 1/286* (2013.01); *F24D 19/0092* (2013.01); *B01D 2221/02* (2013.01); *B03C 2201/18* (2013.01); *B03C 2201/28* (2013.01); *C02F 2101/203* (2013.01); *C02F 2201/48* (2013.01)

(58) Field of Classification Search
CPC .............. F24D 19/0092; B01D 21/009; B01D 21/0042; B01D 21/0092; B01D 21/2405; B01D 21/2411; B01D 21/2483; B03C 1/286; B03C 2201/18; B03C 2201/28; C02F 1/481; C02F 2101/203; C02F 2201/48
See application file for complete search history.

(56) References Cited

U.S. PATENT DOCUMENTS

| 6,488,848 B1 | 12/2002 | Smith |
| 2009/0266768 A1 | 10/2009 | Garrison |
| 2013/0248433 A1* | 9/2013 | Downie .................. 210/223 |

FOREIGN PATENT DOCUMENTS

| EP | 0026530 B1 * | 2/1983 |
| EP | 873774 A1 * | 10/1998 |
| GB | 2458647 A * | 9/2009 |

OTHER PUBLICATIONS

The Translation of the Chapter II International Preliminary Report on Patentability PCT 409 for PCT/GB2013/051321, dated Oct. 9, 2014.*

*Primary Examiner* — David A Reifsnyder
(74) *Attorney, Agent, or Firm* — Andrew S. Langsam; Pryor Cashman LLP

(57) ABSTRACT

A separator device for removing particles from suspension in a fluid comprising: a housing, having a central axis extending between first and second opposing ends; an inlet and an outlet provided in an end of the housing; a separation chamber for separating solid particles from the fluid, including obstruction means to slow the flow of fluid within the chamber.

20 Claims, 9 Drawing Sheets

SEPARATOR DEVICE FOR A HEATING SYSTEM

The present invention relates to a separator device suitable for separating particles from a fluid flow and particularly but not exclusively to a separator device for use in a hydronic heating system.

BACKGROUND TO THE INVENTION

In a typical heating system, water is circulated by a pump through several radiators, possibly a heat exchanger in a hot water cylinder, and a boiler. During circulation, solid particles (for example, iron oxide) which have come loose from the interior of the radiators and pipework can become suspended in the water. Solid particles can also be present as contaminants in the water originally supplied to the system, and the water can become contaminated by dirt where an open expansion tank forms part of the system. These solid particles can cause malfunction if they build up in the boiler or pump, and reduce the effectiveness of the heating system by restricting the flow of water and clogging radiators. The water in a heating system should therefore be continually cleaned to remove solid particles as far as possible.

Various devices are known for removing particles from suspension in a flow of water. Typically these devices comprise of a substantially cylindrical housing with an inlet and an outlet provided on the curved surface of the cylinder. Known devices must therefore be mounted with the curved surface of the cylinder parallel to a wall, and separation means within the housing are designed to operate effectively in this orientation. The height of the cylindrical housing (i.e. the distance between the two planar surfaces of the cylinder) is typically much greater than the diameter of the cylinder.

When a heating system is serviced, the separator device must be cleaned to remove the particles which have been separated from the fluid. A removable screw-top is typically provided at the upper end of the cylindrical housing which, when removed, allows access to the inside of cylindrical housing. A removable insert is typically provided within the housing, which must be removed for cleaning.

The removable insert is typically of similar longitudinal extent to the cylindrical housing. Therefore to allow the insert to be removed from the housing, the separator device must be installed where there is a vertical space between horizontal surfaces of at least twice the height of the housing. This requirement imposes an unwelcome constraint on the installer in terms of where the device may be installed, particularly where the separator device is being retrofitted to an existing installation. For example, there is often insufficient space between the bottom of a boiler and a counter top. In some cases it may simply not be possible to fit a device of suitable capacity which requires such a large vertical space.

It is an object of this invention to provide a separator device which reduces or substantially obviates the above mentioned problems.

STATEMENT OF INVENTION

According to a first aspect of the invention, there is provided a separator device for removing particles from suspension in a fluid comprising:
a housing, having a central longitudinal axis extending between first and second opposing ends;
an inlet and an outlet provided in an end of the housing and extending from the housing parallel to the central longitudinal axis of the housing; and
a separation chamber for separating solid particles from the fluid, including obstruction means to slow the flow of fluid within the chamber.

In use, the separator device with inlet and outlet in an end of the housing is mounted such that the central longitudinal axis of the housing is horizontal. The advantage of this arrangement is that the vertical space required for installation of the device is substantially less than the space required by a device which is mounted with the central axis vertically. This allows installation between, for example, the bottom of a boiler and a counter top.

A magnet may be provided within the housing. The purpose of the magnet is to attract ferrous particles out of the fluid flow.

The obstruction means may include one or more curved walls. The curved walls may have two substantially concave curved sides, and may define concave collection areas for collection of particles. The concave collection areas may face in different directions. By providing two concave sides, the walls define concave collection areas which face upwards, in whichever orientation the separation chamber is installed within the chamber.

The separation chamber may be removable from the housing for easy cleaning. The separation chamber may be provided as part of a removable insert, and the removable insert may provide a sleeve around a magnet. By providing a sleeve around the magnet and a separation chamber in the same removable insert, magnetic particles which have been attracted by the magnet may be easily removed at the same time as nonmagnetic particles which have become trapped in the separation chamber.

Deflectors may be provided near an end of the removable insert. The deflectors deflect the flow of water as it enters at the inlet, therefore setting up a swirl within the housing. When the separator device is installed with the central longitudinal axis horizontal, as described above, the swirl of liquid set up by the deflectors includes substantially circular flows in substantially vertical planes.

A key in the form of a planar member may be provided at an end of the removable insert, and a corresponding socket provided in the housing to receive the planar member. The planar member and corresponding socket ensure that the insert may only be installed in the correct orientation. The arrangement of obstruction means may be rotationally symmetrical, in which case either of two orientations at 180 degrees to each other will be correct.

With the separator device vertically disposed, the separation chamber may be open to the housing at its upper end. Inlets may be provided on the underside of the separation chamber, and may spiral upwardly into the separation chamber. The inlets may spiral in opposing arcuate directions. The inlets guide part of the swirling flow within the housing into the separation chamber, without substantially inhibiting the flow through the device.

A slot may be provided in the side of the separation chamber. Water flows through the inlets into the separation chamber, then out of the open top of the separation chamber and out of the slot, where provided. During its passage through the separation chamber, the water is slowed by the obstruction means, causing suspended particles to fall out of the flow and become trapped within the concave collection areas.

The separation chamber may alternatively comprise the entire inside of the housing. Where this is the case, the obstruction means may be provided as part of a removable insert, and may include substantially planar protrusions. The planar protrusions may be orthogonal to each other. The obstruction means may alternatively or additionally include protrusions substantially in the shape of chevrons.

The housing may be closed by a removable closure, for example, a watertight lid. The lid may preferably be provided in an end of the housing which is opposite the end in which the inlet and outlet are provided. The lid can easily be removed to allow access to the housing to remove the removable insert for cleaning, and tightly seals the housing in use. A bleed valve may be provided for releasing trapped air from within the housing.

A pouring lip may be provided on the housing. The pouring lip is advantageous since the device may be installed horizontally, with the inlet and outlet against a wall, and with the lid in a vertical plane, on the end of the housing furthest from the wall. Water within the device will therefore escape when the lid is removed for service, and must be drained into a container for disposal. The pouring lip allows the water to be drained with minimum risk of spillage.

According to a second aspect of the invention, there is provided a separator device for removing particles from suspension in a fluid, comprising:

a housing, having a central longitudinal axis extending between first and second opposing ends, the housing being mounted to a pipe with the central longitudinal axis of the housing perpendicular to the pipe;

an inlet and an outlet in an end of the housing for fluidly communicating the housing with the pipe; and a separation chamber for separating solid particles from the fluid, including obstruction means to slow the flow of fluid, the obstruction means being provided on an insert, the insert being removable from the housing by moving the removable insert in a direction parallel with the central longitudinal axis of the housing.

The removable insert may also include a sheath for a magnet.

DESCRIPTION OF THE DRAWINGS

For a better understanding of the present invention, and to show more clearly how it may be carried into effect, reference will now be made, by way of example only, to the accompanying drawings, in which.

DESCRIPTION OF PREFERRED EMBODIMENTS

Figure 1:
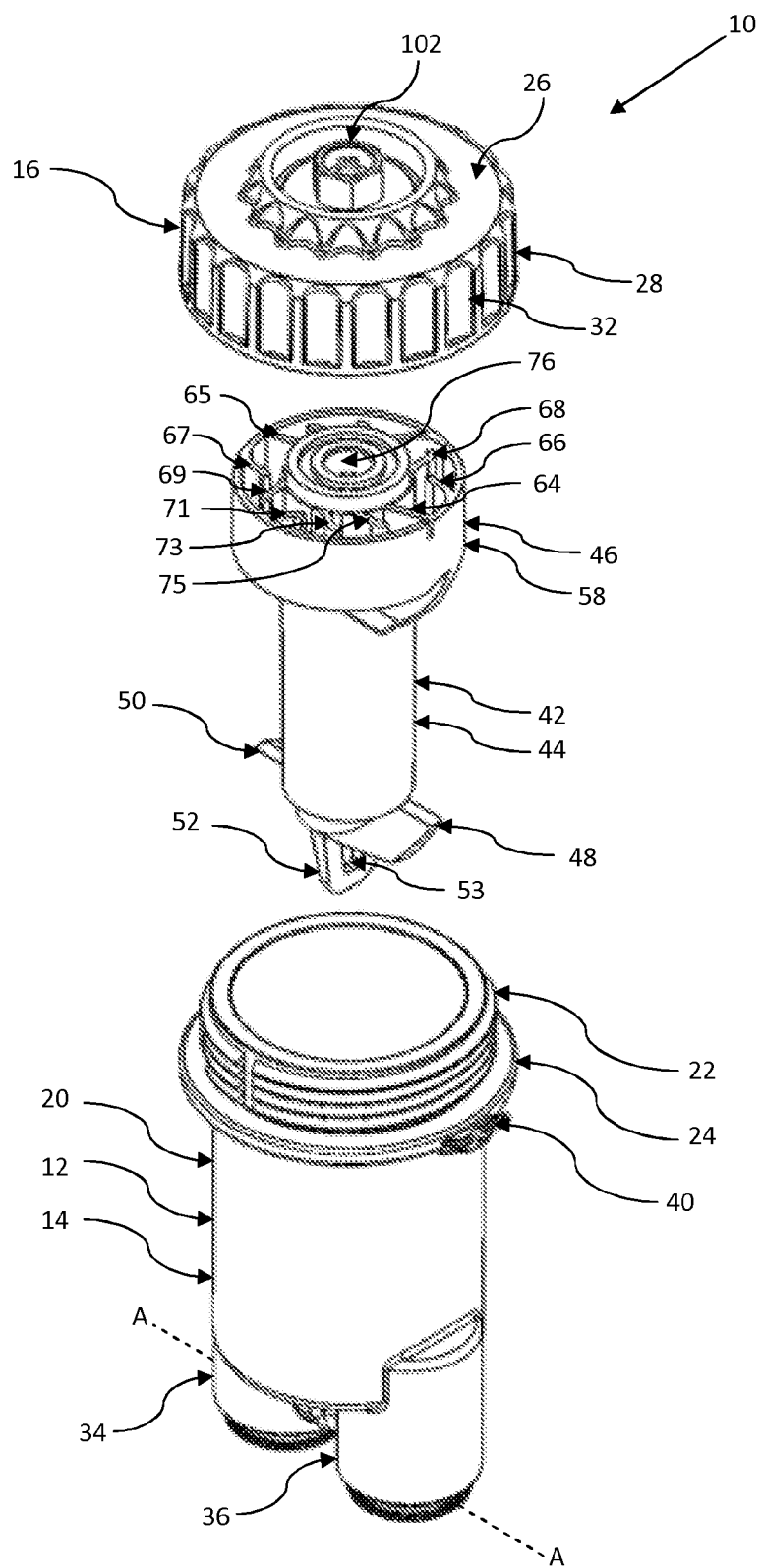
FIG. 1 shows an exploded perspective view of a separator device.
Figure 2:
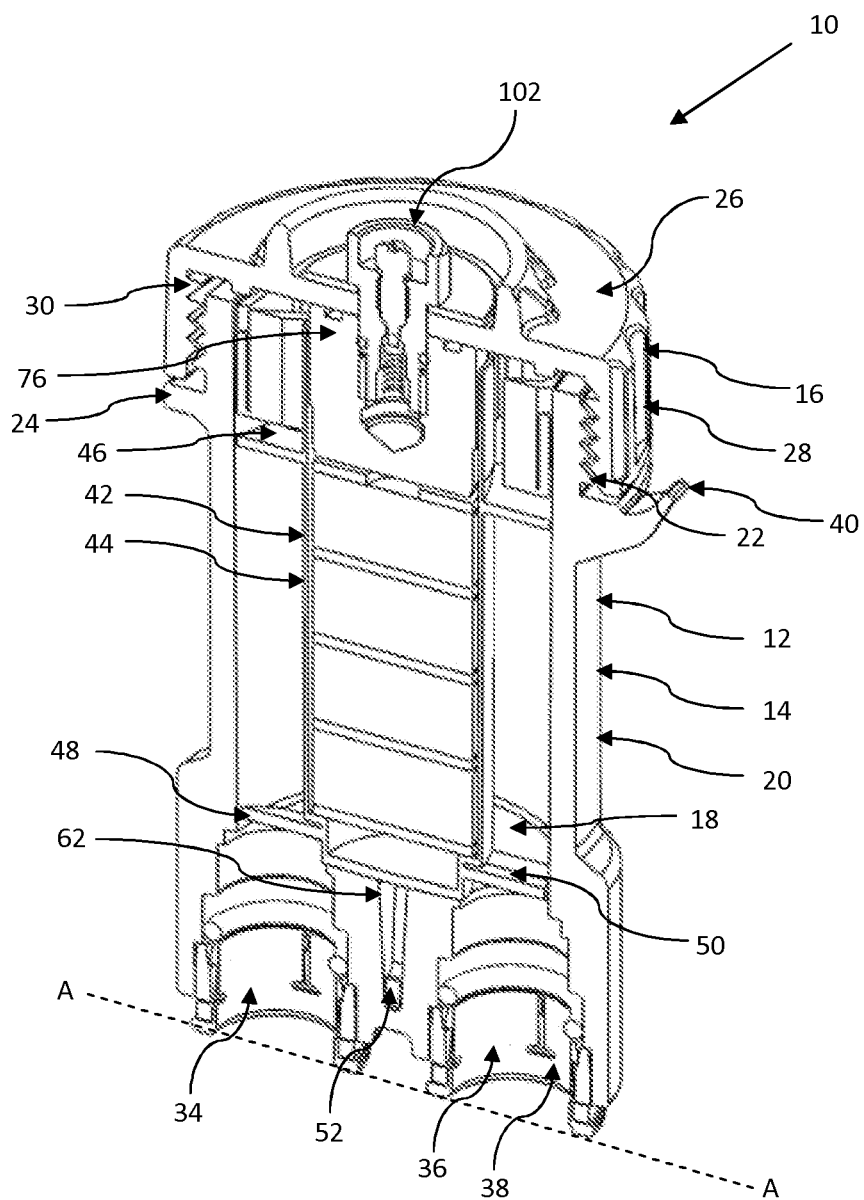
FIG. 2 shows a cut-away perspective view of the separator device of FIG. 1.
Figure 3:
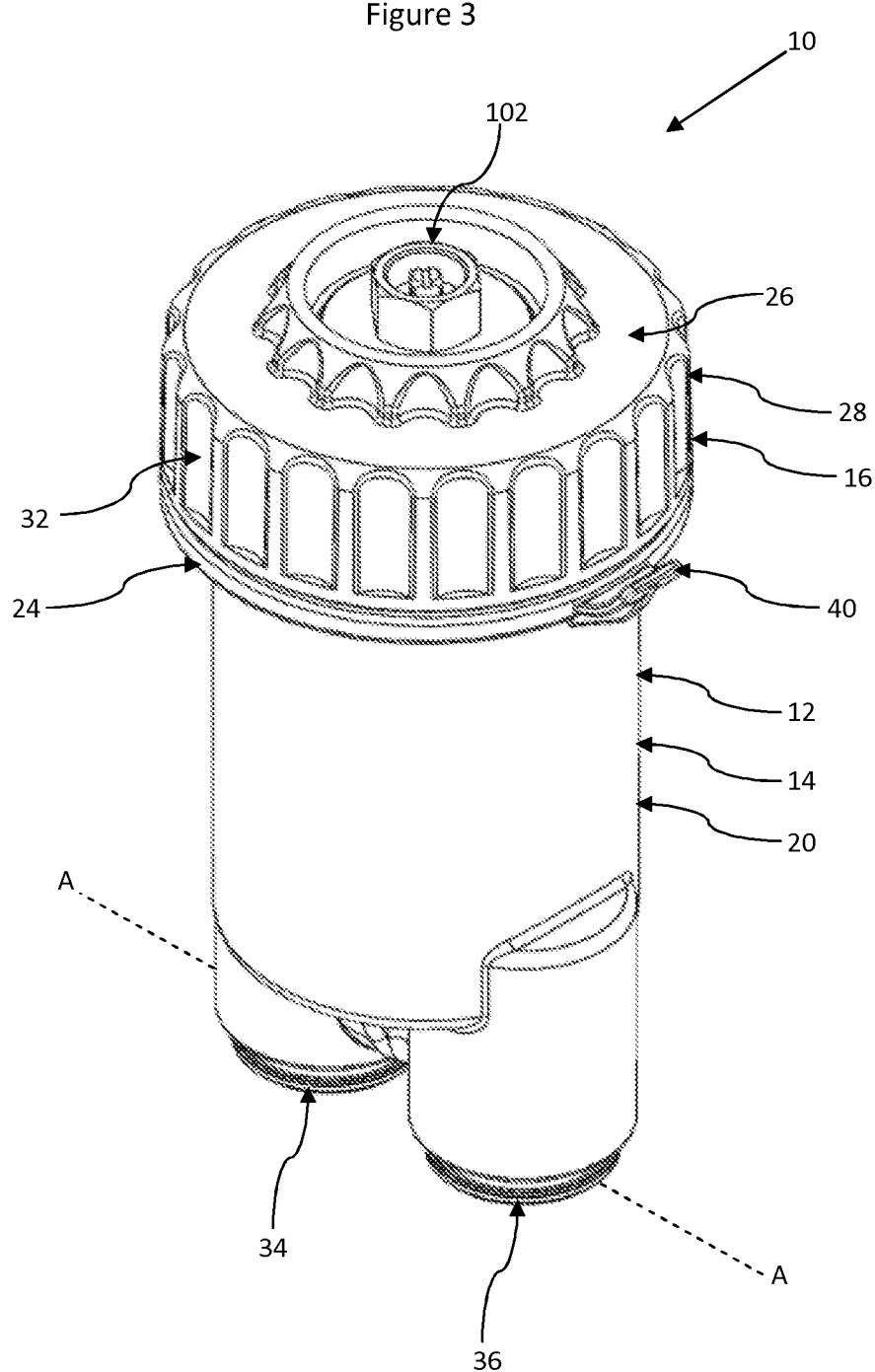
FIG. 3 shows a perspective view of the separator device of FIG. 1.
Figure 4:
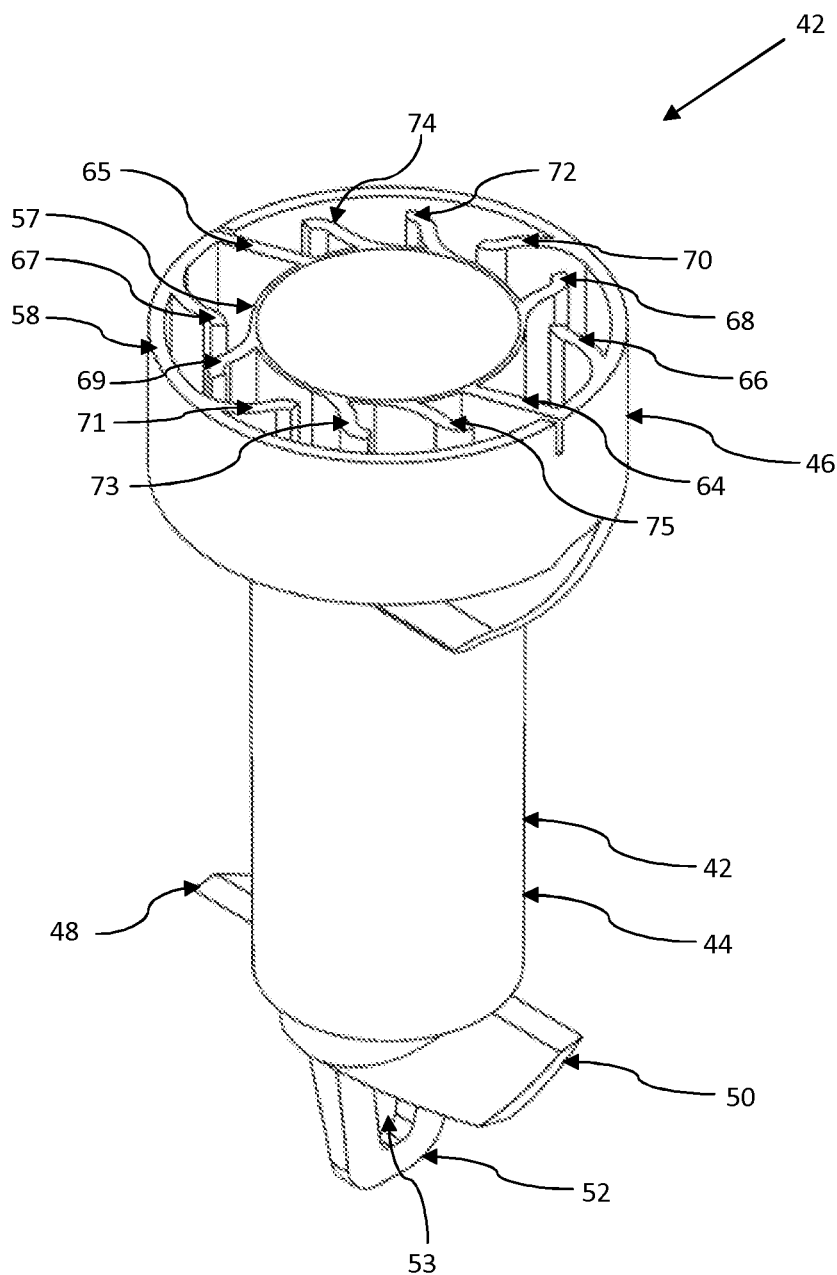
FIG. 4 shows a perspective view of a removable insert, being a component part of the separator device of FIG. 1.

Referring firstly to FIGS. 1 to 4, a separator device for separating particles from suspension in a fluid is indicated generally at 10. A housing 12 is provided, comprising a body portion 14 and a removable closure portion 16. The body portion 14 is substantially a cylindrical shell, open at the upper end as viewed, that is, the body portion 14 comprises a floor 18 and a wall 20. The upper end of the wall 20 of the body portion 14 is formed with a male thread 22 and, directly below the male thread, a rim 24.

The closure portion 16 is in the form of a screw-on cap comprising a circular planar roof 26 and a wall 28 extending below the edge of the roof. A thread 30 is formed on the interior surface of the wall 28, for cooperating with the male thread 22 on the top of the wall 20 of the housing body portion 14. A plurality of recesses 32 are provided spaced uniformly around the outside of the wall 28 of the closure portion 16 in order to assist a user in gripping the closure portion 16 to effect removal.

First and second hollow cylindrical sockets 34, 36 are provided in the floor 18 of the housing body 14, each extending parallel to each other and to the central axis of the cylindrical housing 12. John Guest Speedfit® connectors 38 are provided within the sockets 34, 36, allowing easy fitting to a heating circuit.

A bleed valve 102 is provided through the centre of the screw-on cap 16 and is screwed into a plug 76 within the housing 12. The bleed valve can also be used for dosing with an inhibitor, as described in the Applicant's granted patent EP1626809. The description of EP1626809 in incorporated herein by reference.

A pouring lip 40 is provided on the rim 24, to facilitate draining of water from within the housing whilst reducing or eliminating the risk of spillage, when the device is installed horizontally. The pouring lip 40 extends outwardly from the rim 24, curving away from the curved wall of the housing 12 with decreasing rate and towards the top of the housing 12 as viewed with increasing rate. The centre of the pouring lip 40 is in the vertical plane projected from the line A-A which passes through the centres of both first and second cylindrical sockets 34, 36. The device is intended to be mounted with the lip 40 on the underside of the device for directing water, eg central heating system water, into a container for collection.

An insert 42 is removably contained within the housing 12. The removable insert comprises a elongate central section 44 formed as a hollow cylinder, a separation chamber 46 at an upper end of the insert 42, first and second deflectors 48, 50 at a lower end of the insert 42, and a planar member forming a key 52 also at the lower end of the insert 42.

A cylindrical magnet is provided inside the hollow central section of the insert 42, so that the central section 44 acts as a sheath around the magnet. In use, the magnet will attract ferrous particles which will collect on the outer surface of the central sheath section 44 of the insert 42. When the heating system is serviced, the insert 42 may be removed from the housing 12, and the magnet removed from within the insert 42. When the magnet is removed, ferrous particles will easily fall away from the outer surface of the central sheath section 44 of the insert 42.

The separation chamber 46 is formed as a rectangular toroidal shell with an open top end, that is, a tray having a floor, an inner curved wall 57 and an outer curved wall 58. Within the separation chamber 46, protrusions extend from the floor, the protrusions having a vertical extent matching the vertical extent of the inner and outer walls 57, 58. The protrusions therefore form interior walls which define passageways within the separation chamber 46.

First and second deflectors 48, 50 extend outwardly from the lower end of the curved surface of the elongate central section 44 of the removable insert 42, at 180° to each other. The deflectors 48, 50 are substantially planar and are tilted from the horizontal plane in opposing directions. When the insert 42 is installed within the housing 12, the deflectors are disposed above the inlet and outlet sockets 34, 36. Hence the centres of the deflectors 48, 50 lie in the vertical plane projected from the line A-A which passes through the centres of both first and second cylindrical sockets 34, 36. Whichever of the two sockets is used as the inlet, water will be deflected to set up a swirl which is anticlockwise from the top of the housing as viewed.

A key in the form of a substantially planar member 52 extends from the bottom surface, as viewed, of the central section 44 of the sheath 42 in a vertical plane which intersects line A-A at right angles. The planar member 52 is in the shape of a trapezium, with the longer parallel side adjacent to the bottom of the central sheath section 44 of the insert 42. An aperture 53 in the planar member 52 is a similar shape to the planar member 52, but a smaller size. The planar member 52 is received by a matching socket 62 in the floor 18 of the housing body 14. The planar member 52 will only fit into the socket 62 when the insert 42 is in the correct orientation, in which the deflectors 48, 50 are disposed above the sockets 34, 36. Since the insert 42 is rotationally symmetrical, it can be rotated by 180° and still be in the correct orientation.

Figure 5:
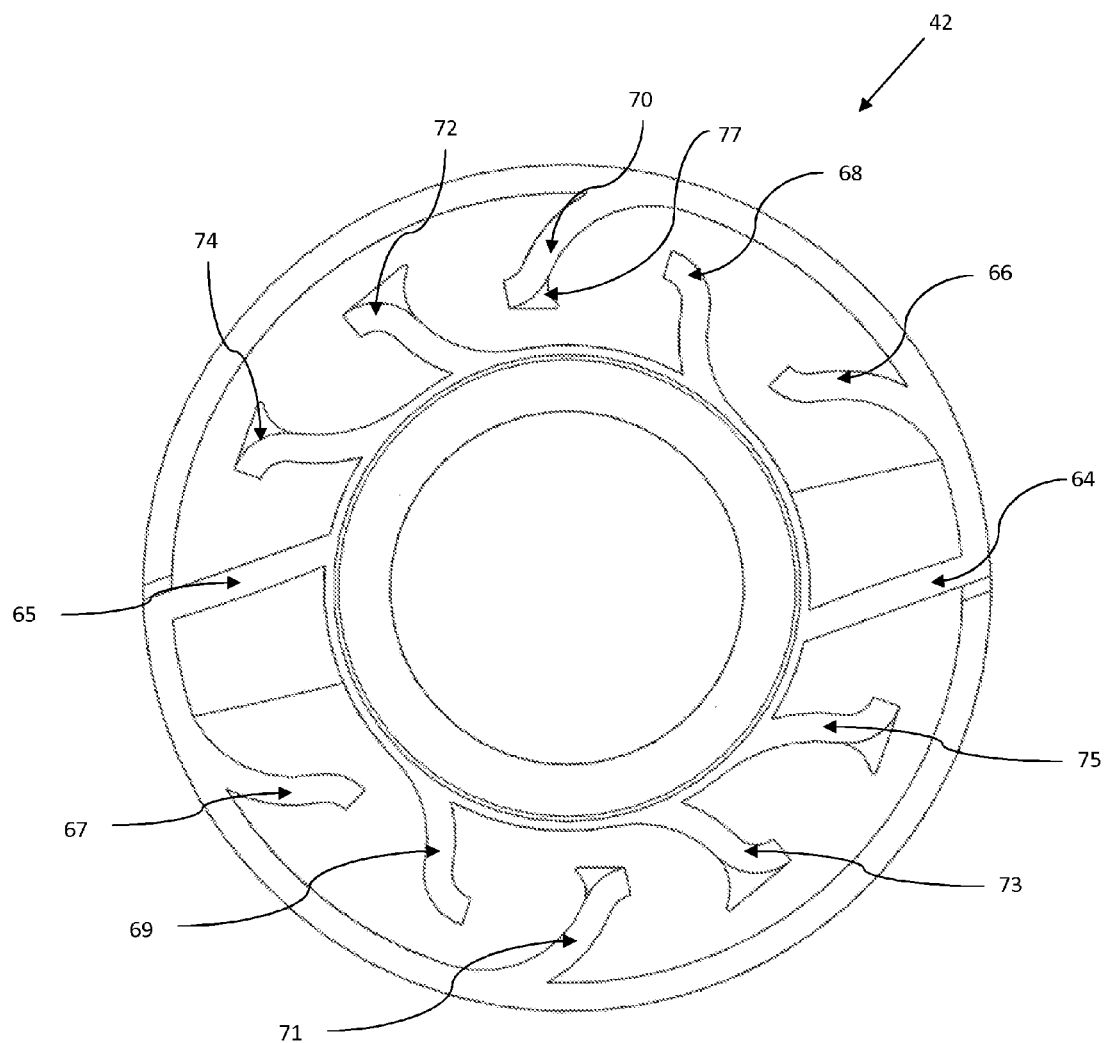
FIG. 5 shows a top view of the insert of FIG. 4.

The arrangement of protrusions in the separation chamber 46 is best shown in FIG. 5. First and second planar walls 64, 65 extend from the inner wall 57 to the outer wall 58 of the toroidal separation chamber 46, effectively dividing the chamber 46 into two identical sections. The planar walls are at an angle to the radius of the separation chamber 46. Each of the two sections of the separation chamber 46 contains five curved walls 66, 68, 70, 72, 74 and 67, 69, 71, 73, 75.

With reference to the first planar wall 64 and moving anticlockwise as viewed from that planar wall 64, a first curved wall 66 extends from the outer wall 58 of the separation chamber 46, curving away from the outer wall 58 towards the centre of the insert with increasing rate and away from the first planar wall 64 with decreasing rate. An end portion of the first curved wall 66 then curves in the opposite direction, so that it curves away from the outer wall with decreasing rate and away from the planar wall 64 with increasing rate.

A second curved wall 68 extends from the inner wall 57 of the separation chamber 46, curving away from the inner wall 57 with increasing rate and away from the first planar wall 64 with decreasing rate. An end portion of the second curved wall 68 curves in the opposite direction, similar to the end portion of the first curved wall 66.

A third curved wall 70 extends from the outer wall 58 of the separation chamber 46, with a similar curve to the first curved wall 66. At the end of the third curved wall, a half-height section 77 curves back towards the first planar wall 64, so that a lower section of the wall 70 widens to form a substantially concave surface facing the first planar wall 64. The opposite surface of the third curved wall 70 is identical to the corresponding surface of the first curved wall 66.

Fourth and fifth curved walls 72, 74 are identical, each extending from the inner wall 57 of the separation chamber 46, with similar curves to the second curved wall 68. The end portions of the fourth and fifth curved walls 72, 74 include half-height sections similar to half-height section 77 at the end of the third curved wall 70.

Continuing anticlockwise around the toroidal separation chamber 46, the next protrusion is the second planar wall 65, followed by sixth, seventh, eighth, ninth and tenth curved walls 67, 69, 71, 73, 75, being identical to first, second, third, fourth and fifth curved walls 66, 68, 70, 72, 74 respectively.

The planar and curved walls are spaced at equal intervals around the toroid, in the anticlockwise order 64, 66, 68, 70, 72, 74, 65, 67, 69, 71, 73, 75.

Figure 6:
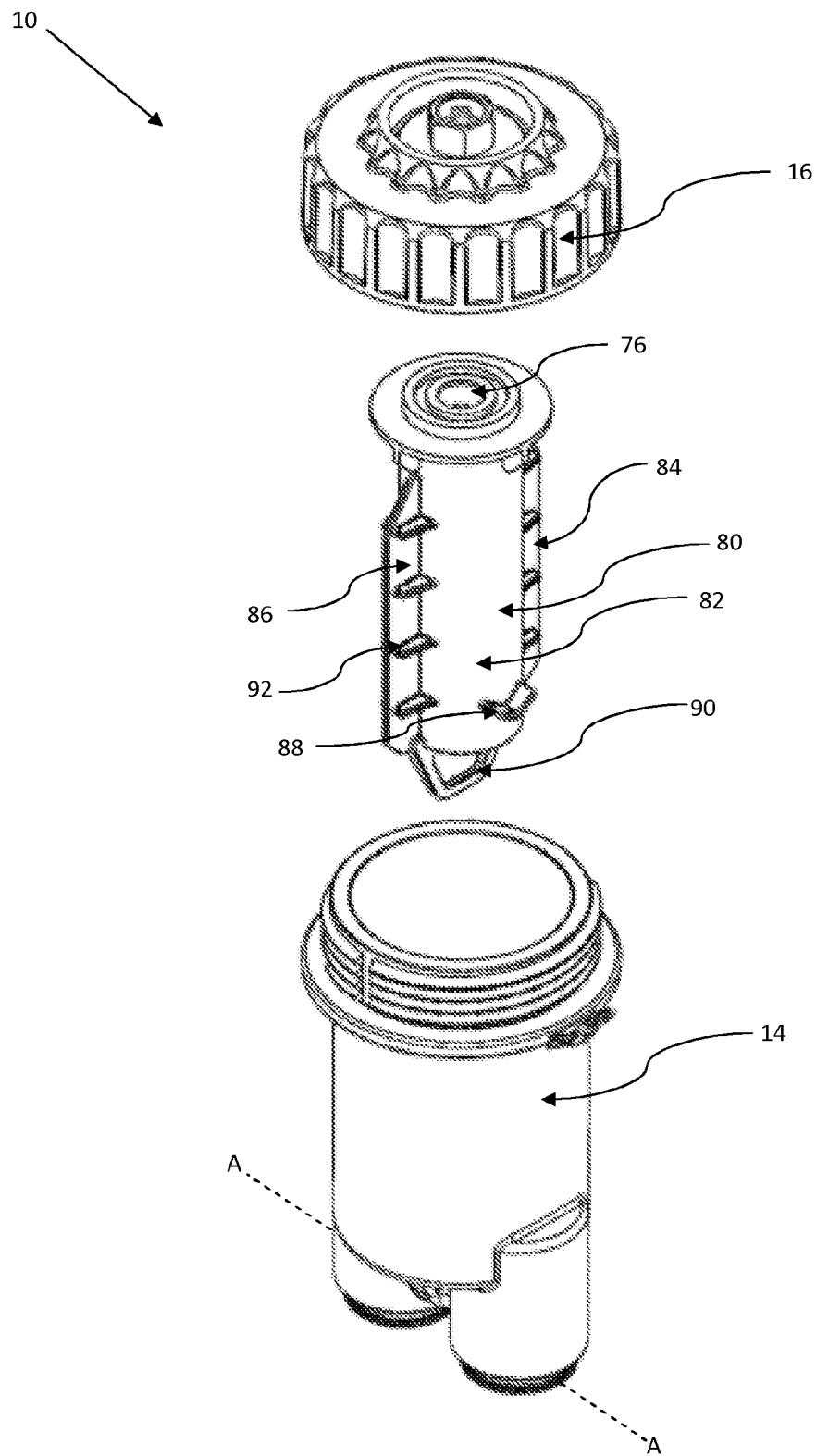
FIG. 6 shows an exploded perspective view of a separator device, containing an alternative removable insert.
Figure 7:
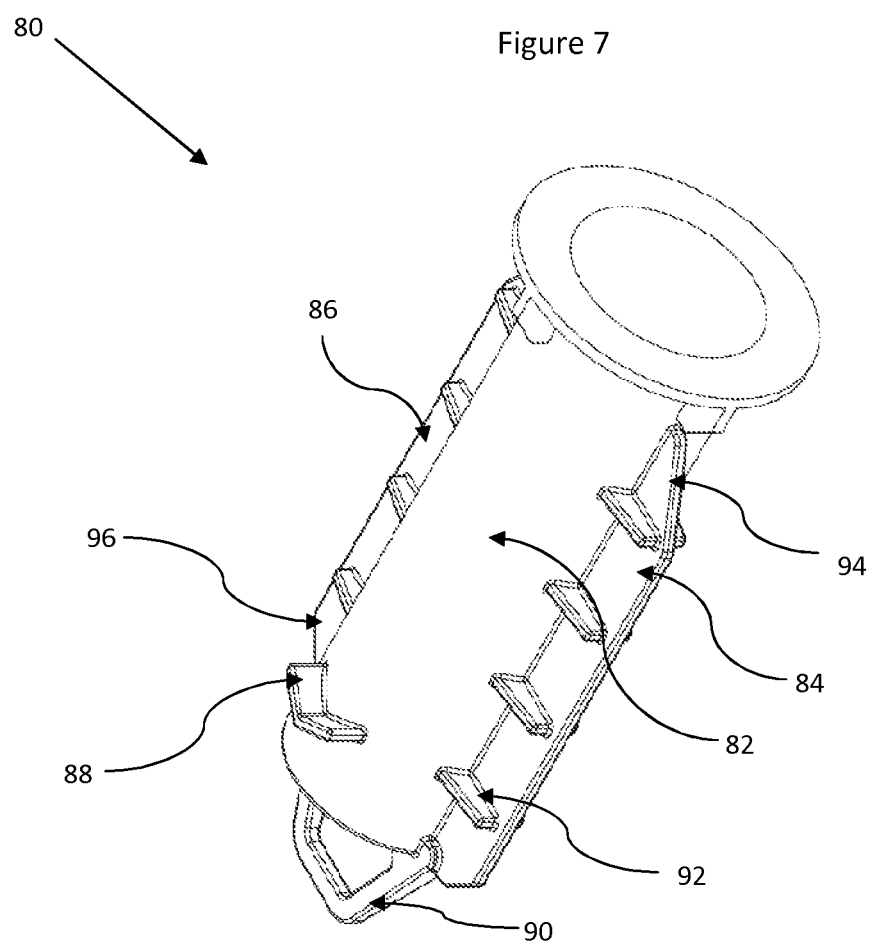
FIG. 7 shows a perspective view of the removable insert of FIG. 6.
Figure 8:
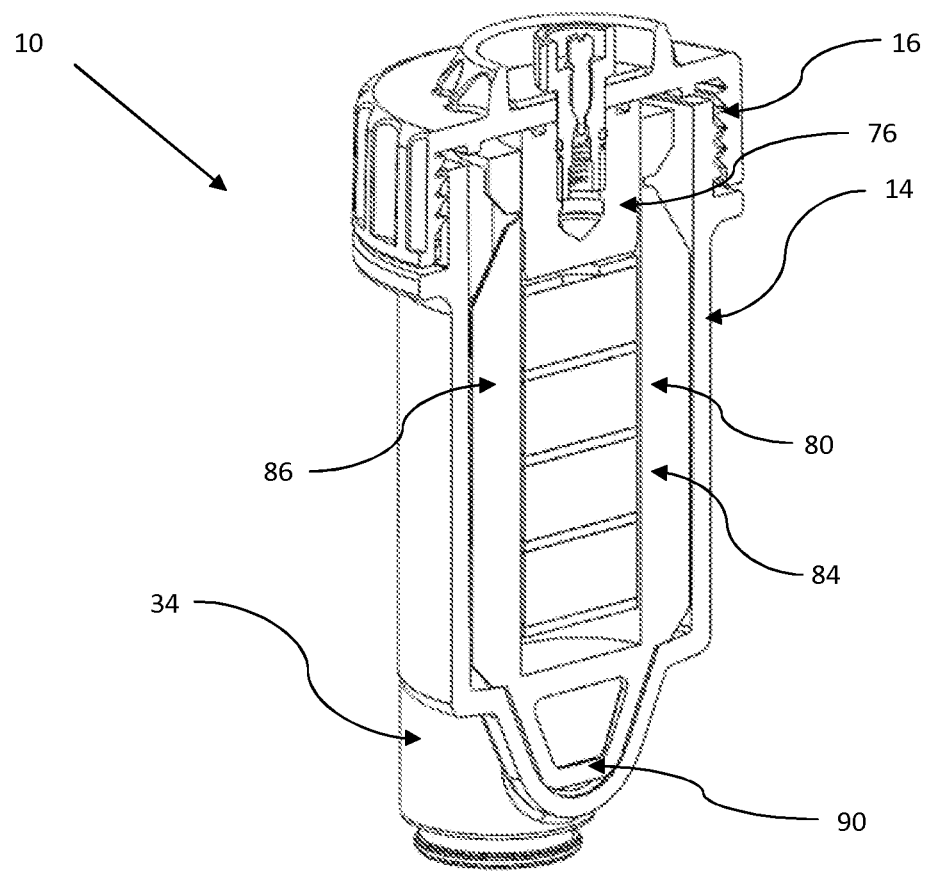
FIG. 8 shows a cut-away perspective view of the separator device of FIG. 6.

Referring now to FIGS. 6 to 7, an alternative embodiment of a removable insert is indicated at 80. The alternative insert 80 may be used in place of the insert 42. The remaining parts of the separator device 10 are identical.

The alternative insert 80 comprises a hollow cylindrical section 82, two planar wing sections 84, 86, protrusions 88, and a planar locking section 90. The cylindrical section 82 may contain a magnet in the same manner as the insert 42, and the planar key section 90 is of the same design as the planar key section 52 of the insert 42.

The planar wing sections 84, 86 extend outwardly at 180° to each other from the outer surface of the cylindrical section 82. Each planar wing section 84, 86 is perpendicular to the tangent of the cylindrical section 82 at the point where the planar wing section meets the cylindrical section 82. Each planar wing section 84, 86 has an elongate extent just less than the elongate extent of the cylindrical section 82, and has a width of approximately one third of the diameter of the cylindrical section 82. The planar wing sections lie in the same plane, which is vertical as viewed in FIG. 6, and which intersects line A-A at a right angle. Each planar wing section 84, 86 is substantially rectangular, but with the upper and lower outer corners 94, 96 chamfered off. A larger section of corner is removed from the upper corner 94 than from the lower corner 96.

Two protrusions 88 extend outwardly from the surface of the cylindrical section 82 at 90° to the planar wing sections 84, 86. The protrusions 88 from the side as viewed are in the shape of a chevron, pointing downwards as viewed in FIG. 1 towards the planar locking member 90. The protrusions 88 define a collection area on the inside of the chevron.

Eight horizontal planar members 92 for obstructing flow extend from the surface of the cylindrical section 82 of the insert 80, four intersecting each of the planar wing sections 84, 86. The horizontal planar members 92 are equally spaced along the vertical extent of each planar wing section 84, 86, as viewed. Each horizontal planar member 92 is at right angles both to the coincident planar wing section 84 or 86 and to the surface of the cylindrical section 82, and is substantially in the shape of a trapezium, with the longer parallel side adjacent to the surface of the cylindrical section 82. The horizontal planar members 92 have equal extent at either side of the coincident planar wing section 84 or 86.

At the top of the insert 80, a ring extends from the upper edge of the hollow cylindrical section 82, overhanging the outer surface of the cylindrical section by approximately one fifth of the diameter of the cylindrical section. The plug 76 fits within the top of the cylindrical section 82.

With the insert 80 installed within the housing 12, water will flow in through the inlet, through the housing 14 on one side of the insert 80, then over the top of the planar wing sections 84, 86 where the corners have been removed, through the housing 14 on the other side of the insert 80 and out of the outlet. The magnet inside the cylindrical section 82 of the insert 80 will attract ferrous particles out of the flow, and the planar horizontal sections 92 and chevron-shaped protrusions 88 serve to slow the flow of fluid so that nonmagnetic particles fall out of suspension.

Figure 9:
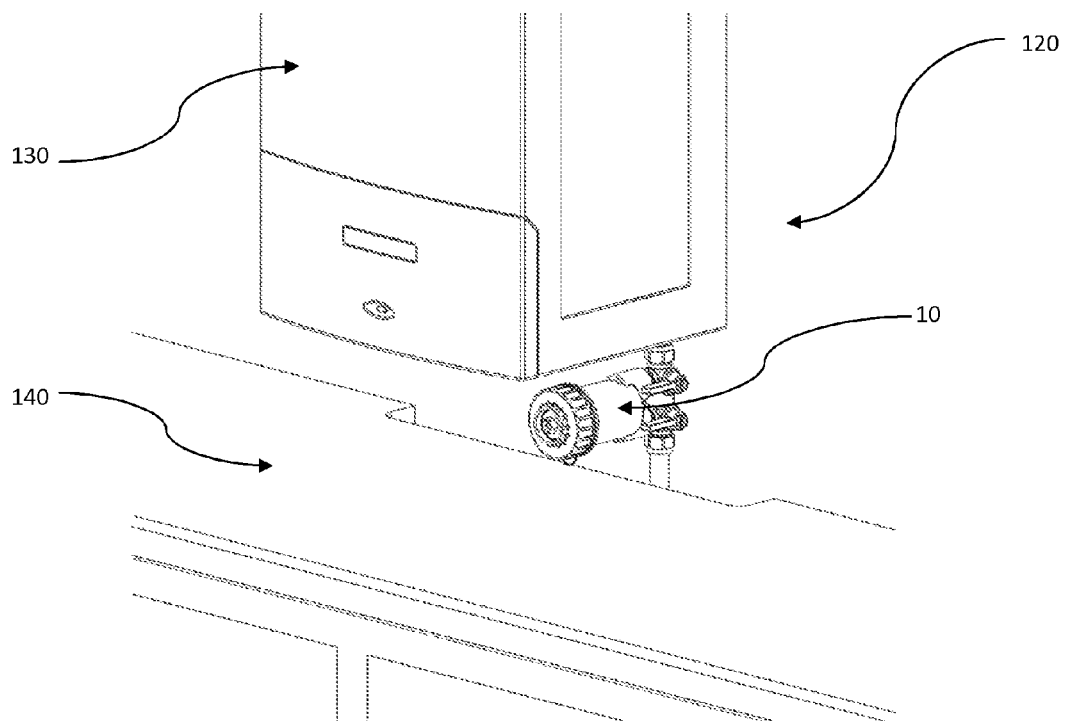
FIG. 9 shows the device of FIG. 1, installed between a boiler and a counter top.

In use, the separator device 10 may be mounted with the central axis between the first and second opposing ends of the housing 12 perpendicular to pipework on a wall 120, as shown in FIG. 9. This substantially reduces the vertical space which is required by the device, affording the installer additional flexibility by allowing installation within a limited vertical space, for example between a boiler 130 and a countertop 140.

The embodiments described above are provided by way of example only, and various changes and modifications will be apparent to persons skilled in the art without departing from the scope of the present invention as defined by the appended claims.

The invention claimed is:

1. A magnetic filter for a central heating system comprising:
   a housing, having a central longitudinal axis extending between first and second opposing ends;
   an inlet and an outlet provided in an end of the housing and extending from the housing parallel to the central longitudinal axis of the housing;
   a magnet disposed within the housing;
   a separation chamber for separating solid particles from a fluid, including obstruction means to slow the flow of fluid within the chamber, the obstruction means including a plurality of curved walls forming concave collection areas for collection of particles;
   a removable closure to the housing, at the end of the housing opposing the inlet and outlet, for draining fluid from the housing and allowing withdrawal of the magnet from the housing.

2. A magnetic filter as claimed in claim 1, in which at least one of the curved walls has two substantially concave curved sides.

3. A magnetic filter as claimed in claim 1, in which the concave collection areas face in different directions.

4. A magnetic filter as claimed in claim 1, in which the separation chamber is removable from the housing.

5. A magnetic filter as claimed in claim 4, in which the separation chamber is provided as part of a removable insert.

6. A magnetic filter as claimed in claim 5, in which the removable insert includes a sheath for a magnet.

7. A magnetic filter as claimed in claim 5, in which a swirl of fluid is set up within the housing by means of deflectors mounted near an end of the removable insert.

8. A magnetic filter as claimed in claim 1, in which the separation chamber is open to the housing at one end.

9. A magnetic filter as claimed in claim 8, in which the separation chamber has inlets in the side opposite the open end.

10. A magnetic filter as claimed in claim 9, in which the inlets spiral upwardly into the separation chamber.

11. A magnetic filter as claimed in claim 10, in which the inlets spiral upwardly in opposing arcuate directions.

12. A magnetic filter as claimed in claim 1, in which a slot is provided in the side of the separation chamber.

13. A magnetic filter as claimed in claim 1, in which the separation chamber comprises the entire inside of the housing.

14. A magnetic filter as claimed in claim 13, in which the obstruction means are provided as part of a removable insert.

15. A magnetic filter as claimed in claim 14, in which the obstruction means includes orthogonal planar walls.

16. A magnetic filter as claimed in claim 13, in which the obstruction means include substantially planar protrusions.

17. A magnetic filter as claimed in claim 13, in which the obstruction means include protrusions substantially in the shape of chevrons.

18. A magnetic filter as claimed in claim 1, in which a pouring lip is provided on the housing.

19. A magnetic filter as claimed in claim 18, in which the pouring lip is provided at the end of the housing at which the removable closure is provided.

20. A magnetic filter as claimed in claim 1, installed with the inlet and outlet in fluid communication with a central heating circuit, and with the central longitudinal axis of the housing substantially horizontal.

* * * * *